United States Patent [19]

Dekel

[11] Patent Number: 5,622,324
[45] Date of Patent: Apr. 22, 1997

[54] SPOOL HAVING A FILAMENT WOUND ONTO A BOBBIN AND METHOD FOR MANUFACTURING SAME

[75] Inventor: Ehud Dekel, Nofit, Israel

[73] Assignee: State of Israel, Ministry of Defence, Rafael Armaments Development Authority, Haifa, Israel

[21] Appl. No.: 503,850

[22] Filed: Jul. 18, 1995

[30] Foreign Application Priority Data

Jul. 21, 1994 [IL] Israel .......................................... 110395

[51] Int. Cl.⁶ .............................. B65H 55/04; B65H 54/00
[52] U.S. Cl. ........................... 242/178; 242/18 G; 242/159
[58] Field of Search ................................ 242/18 R, 18.1, 242/18 G, 25 R, 158 R, 177, 159, 178, 47

[56] References Cited

U.S. PATENT DOCUMENTS

| | | | |
|---|---|---|---|
| 4,483,496 | 11/1984 | Weinlich | 242/158 R |
| 5,009,373 | 4/1991 | Hester | 242/18 R X |
| 5,193,761 | 3/1993 | Fritz et al. | 242/18 G X |
| 5,209,416 | 5/1993 | LeCompte | 242/159 X |
| 5,221,060 | 6/1993 | Couvillion et al. | 242/159 |

FOREIGN PATENT DOCUMENTS

| | | |
|---|---|---|
| 0300628 | 1/1987 | European Pat. Off. . |
| 0436505A2 | 7/1991 | European Pat. Off. . |
| 0516340A1 | 12/1991 | European Pat. Off. . |
| WO90/04562 | 5/1990 | WIPO . |

OTHER PUBLICATIONS

"Precision Winding of Fiber Optic Filament—Part 1: Winding Characteristics", IEEE Transactions on Industrial Electronics and Control Instrumentation, vol. 39, No. 3, Jun. 1992, New York US.

Primary Examiner—Michael Mansen
Attorney, Agent, or Firm—Merchant, Gould, Smith, Edell, Welter & Schmidt, P.A.

[57] ABSTRACT

A spool is produced by winding a filament, particularly an optical fiber, onto a bobbin by forming a first layer wound in a helical pattern, forming a transition at a predetermined angle from each successive odd layer to the following even layer and creating starts in each even layer at the transition point from the preceding, odd layer. In each odd layer, except the first layer, two cross-over lines at 180° from one another lie directly over those of the preceding, even layer.

8 Claims, 2 Drawing Sheets

SPOOL HAVING A FILAMENT WOUND ONTO A BOBBIN AND METHOD FOR MANUFACTURING SAME

FIELD OF THE INVENTION

The present invention relates to the winding of a filament onto a bobbin, in a highly orderly manner.

BACKGROUND OF THE INVENTION

There are numerous applications in which a highly orderly winding of a filament on a bobbin is required. For instance, this is needed in order to permit the rapid unwinding of the filament from the bobbin. In order for the winding to be effected in an orderly manner it is required that the following conditions be fulfilled:

a) The filament wound onto the preceding layer is positioned in the space between adjacent windings;

b) The angular location of the filament at the transition from one layer to the next one is effected with high accuracy;

c) The number of step-back turns between the end of one layer and the beginning of the next layer is effected with high accuracy;

d) Cross-over points are positioned at predetermined locations;

e) An adhesive is applied to the wound layers to maintain fiber pack stability and to regulate the pay-out process.

The winding operation is conventionally effected using a winding machine comprising means for rotating the bobbin, means for supplying the wound filament from a supply reel at a predetermined tension, means for moving the fiber feed pulley parallel to the bobbin as winding proceeds and to reverse this movement as a new layer is wound, and means for applying an adhesive to the uppermost wound layer or to the filament at a location between the feed pulley and the bobbin.

One of the applications for such windings is a communication link between unmanned aircraft., or various types of missiles and glide bombs, and a launcher, using for this purpose an optical fiber or a metal wire.

The fibers to which the invention refers undergo extreme temperature changes, e.g., between −40° C. and +55° C., and must be suitably wound so as to be able to undergo payout at extreme temperatures.

The winding of optical fibers or thin wire onto a bobbin is an operation which, for practical purposes, must be carried out at high speed and requires a high level of automation, because the fiber is normally very long.

The bobbin shape is often slightly tapered to facilitate payout.

The Prior Art

According to the known art, a number of winding methods are known. For instance, U.S. Pat. No. 4,746,080 relates to a method of alternatively winding optical fiber on a bobbin. EP 300,628 deals with the so-called "deep nested" filament winding. Also known in the art are the threaded and the orthocyclic windings. Other winding methods are described, e.g., in U.S. Pat. No. 5,221,060 and in EP 516,340.

The prior art methods suffer from the following shortcomings:

a) Excessive winding induced optical attenuation due to numerous lends formed at the cross-over points. This problem is associated especially with winding patterns of the "deeply nested" type.

b) Pack instability: due to gaps formed between adjacent cross-over points, especially in the "ortho-cyclic" pattern.

c) Low volumetric efficiency due to concentration of the cross-over points at certain angular regions.

d) Difficulties in developing an automatic winding apparatus for the production of wound spools, because certain parameters of the winding pattern (such as the angle of transition from layer to layer) result from the winding process itself and cannot be calculated beforehand.

SUMMARY OF THE INVENTION

It is an object of the present invention to provide a winding pattern which can be applied in an automated process, and yet induces low optical attenuation in the fiber spool.

It is another object of the invention to provide a winding pattern which can be used to build a stable fiber pack callable of rapid payout at extreme temperatures.

It is still another object of the invention to provide a method by means of which highly orderly filament winding can be effected on a bobbin.

Other objects and advantages of the invention will become apparent as the description proceeds.

A spool according to a preferred embodiment of the invention will exhibit the following characteristics:

a) it is wound on a helical base pattern:

b) the first layer is wound into the helical pattern;

c) each subsequent turn includes two cross-over points which are tightened to the cross-over points of the adjacent turns to from cross-over lines;

d) in each even layer, one cross-over line begins at the point of transition from the preceding layer, and a second cross-over line begins 180° apart;

e) the cross-over points of each odd layer coincide with those of the preceding layer, causing the cross-over lines of each odd layer (except the first layer) to coincide with those of the preceding layer;

f) the angular location of the point of transition from each odd layer to the next (even) layer is shifted by a preselected angle from the angular location of the point of transition to the preceding even layer.

According to a preferred embodiment of the invention, the angular location of the transition point at which an even numbered layer begins is given by:

$$\alpha = \frac{360}{J}(N-1)$$

J is the number of layers needed for the first cross-over point to complete 360°;

N is the number of layers underneath said layer.

It has been found that it is particularly convenient to operate when J=10. However, the invention is by no means limited to such value, and any other value which provides a result suitable for the intended purpose, is possible.

The invention also encompasses a method for manufacturing a spool comprising a filament wound onto a bobbin, the said method comprising:

a. winding a first layer on a bobbin, in a helical pattern;

b. providing a transition to the second layer;

c. providing a cross-over point 180° from the said transition;

d. winding a second layer while forming two cross-over lines, the first of which starts at the transition point and the second at the cross-over point;

e. providing a transition to the third layer;

f. winding the third layer so that its cross-over lines coincide with those of the second layer;

g. providing a transition to the fourth layer at a preselected angle; and h. repeating steps (c) to (g) above, for the subsequent layers, to form a multi-layer spool.

According to a preferred embodiment of the invention, the angular location of the transition point at which an even numbered layer begins is given by:

$$\alpha = \frac{360}{J} (N-1)$$

J is the number of layers needed for the first cross-over point to complete 360°;

N is the number of layers underneath said layer.

In one preferred embodiment of the invention the bobbin is slightly tapered. In a still preferred embodiment of the invention the filament is an optical fiber.

Of course, other conventional operations can be carried out in conjunction with the method of the invention, such as applying an adhesive between different layers during winding.

DETAILED DESCRIPTION OF PREFERRED EMBODIMENTS

Figure 1:
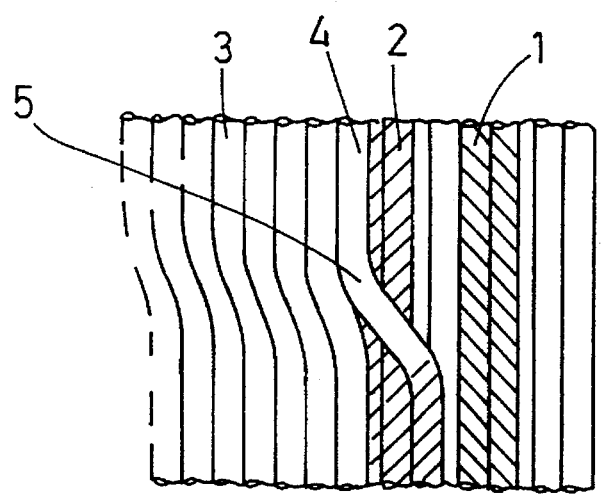
FIG. 1 schematically shows a partial view of four subsequent wound layers.

FIG. 1 illustrates the relationship between four following layers. An even layer N+1, indicated by numeral 11, is wound on layer N. Layer N+2, indicated by numeral 12, is wound on layer N+1, and layer N+3, indicated by numeral 13, is wound on layer N+2. The arrows indicate the direction of advancement while winding each layer. Filament 14 forms a transition 15 from layer N+2 to layer N+3. A transition exists also between layers N and N+1, but it is located at a different angle, and therefore it is not shown in the figure.

Figure 3:
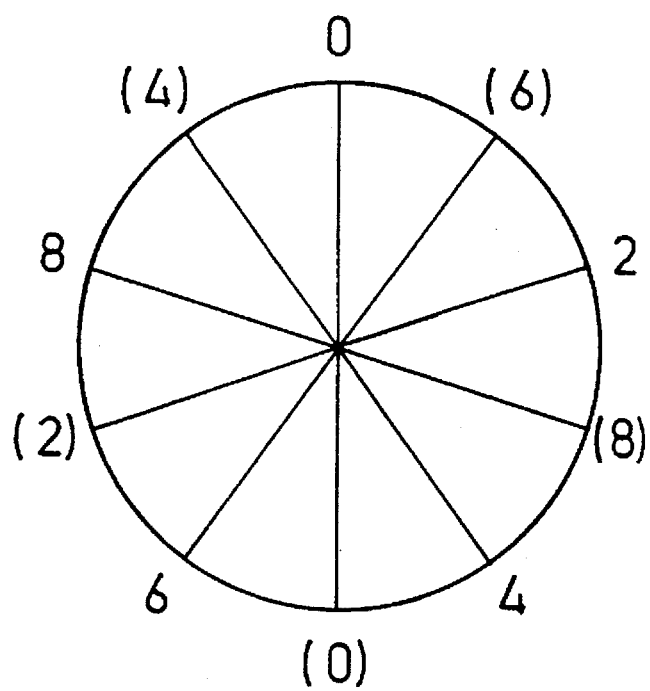
FIG. 3 illustrates the angles of transition and cross-over points according to a preferred embodiment of the invention.

FIG. 3 illustrates the angles of transition and cross-over points, according to a preferred embodiment of the invention, in which J=10. The numbers show for each even layer where the transition point is located, and the same number between parentheses shows the location of the cross-over point of the same layer. In illustration, the numerals 2 and (2) respectively correspond to the positions of the transition and crossover point for even layers whose layer number has 2 as the last digit, for example the 2nd, 12th, and 22nd layers.

As can be easily seen, the transition point and cross-over point will return in this example, to the original location, 0° and 180°, respectively, at the 10th layer. As will be appreciated by the skilled person, this distribution of cross-over points along the circumference of the bobbin homogenizes the surface of the resulting pack, so that the cross-over points are equally distributed and the resulting winding is therefore more orderly than by prior art methods.

Figure 2:
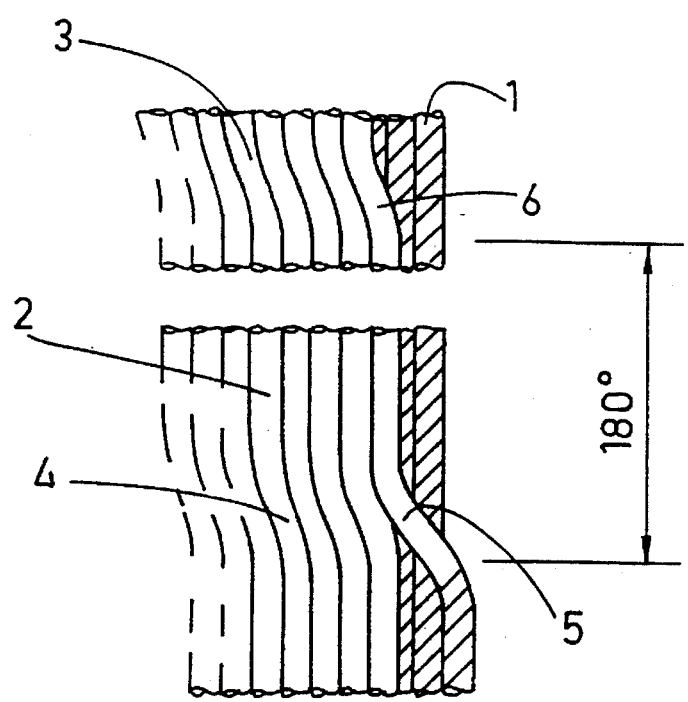
FIG. 2 is a flattened view of the entire circumference of a wound pack showing two cross-over lines formed on the same layer.

FIG. 2 illustrates an even layer 22, wound on an odd layer 21. Two cross-over lines, indicated by 23 and 24, are formed by a plurality of cross-over points tightened together. A first cross-over line starts at the transition point 25, and a second cross-over line starts at cross-over point 26, which is located 180° apart from point 25. As will be appreciated by the skilled person, effecting the cross-over in two stages has the additional advantages that the resulting cross-over line is smoother, and when the wound filament is an optical fiber, the optical attenuation which is associated with cross-over sites is less severe when the number of turns over which the filament crosses is smaller.

Accordingly, the invention provides a simple and convenient means for effecting an automated, highly orderly winding of a filament. While the invention has been described with reference to illustrative preferred embodiments, it is not intended to be limited by them. Other different distributions of the cross-over points over the winding are possible, without exceeding the scope of the invention.

I claim:

1. A spool consisting of a filament wound onto a bobbin in alternating odd and even layers, comprising:

a first layer wound in a helical pattern;

a transition from each odd layer to an immediately following even layer, the transition formed at a predetermined transition angle;

a plurality of layers wound on a helical base pattern, each layer, except the first layer, including two cross-over lines, wherein at each even layer a first cross-over line starts at a transition point from a preceding layer, and a second cross-over line starts 180° apart from the first cross-over line; and wherein at each odd layer, except the first layer, the cross-over lines cross over in the same direction and lie over those of the preceding, even layer.

2. A spool according to claim 1, wherein the transition angle from each odd layer to a following even layer is constant.

3. A spool according to claim 1, wherein an angular location of the transition point at which an even layer begins is given by:

$$\alpha = (N-1) \cdot \frac{360}{J}$$

where J is the number of layers needed for the transition point to complete 360°;

N is the number of layers underneath said layer.

4. A spool according to claim 3, wherein J=10.

5. A method for manufacturing a spool comprising a winding in a plurality of layers, comprising the steps of:

a. winding filament on a bobbin to form a first layer of the plurality of layers in a helical pattern;

b. winding the filament on the bobbin to form remaining layers of the plurality of layers in a helical base pattern;

c. providing a transition point for each layer in the plurality of layers to associated following layer;

d. providing for each even numbered layer a first cross-over point starting at the transition point of an immediately preceding, odd numbered layer and a second cross-over point at 180° around the bobbin from the first cross-over point; and e. providing for each odd numbered layer first and second cross-over points lying directly over the first and second cross-over points, respectively, of an immediately preceding, even numbered layer.

6. A method according to claim 5, wherein an angular location of the transition point at which an even layer begins is given by:

$$\alpha = (N-1) \cdot \frac{360}{J}$$

where J is the number of layers needed for the transition point to complete 360°;

N is the number of layers underneath said layer.

7. A method according to claim 5, wherein the filament is an optical fiber.

8. A method according to claim 5, comprising the further step of applying adhesive on to at least one layer of the plurality of layers.

* * * * *

UNITED STATES PATENT AND TRADEMARK OFFICE
CERTIFICATE OF CORRECTION

PATENT NO. : 5,622,324

DATED : April 22, 1997

INVENTOR(S) : Ehud Dekel

It is certified that error appears in the above-identified patent and that said Letters Patent is hereby corrected as shown below:

Col. 1, line 41: delete "." after the word "aircraft"

Col. 2, line 2: delete "lends" and insert --bends--

Col. 2, line 24: delete "callable" and insert --capable--

Signed and Sealed this

Fourth Day of November, 1997

*Attest:*

BRUCE LEHMAN

*Attesting Officer*     *Commissioner of Patents and Trademarks*